(12) United States Patent
Hyde et al.

(10) Patent No.: US 7,975,542 B2
(45) Date of Patent: Jul. 12, 2011

(54) SYSTEMS AND METHODS FOR PROTECTING A SITE FROM LIGHTNING STRIKES

(75) Inventors: Roderick A. Hyde, Redmond, WA (US); Muriel Y. Ishikawa, Livermore, CA (US); Jordin T. Kare, Seattle, WA (US); Thomas Allan Weaver, San Mateo, CA (US); Lowell L. Wood, Jr., Bellevue, WA (US); Victoria Y. H. Wood, Livermore, CA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 0 days.

(21) Appl. No.: 12/587,808

(22) Filed: Oct. 13, 2009

(65) Prior Publication Data
US 2011/0011611 A1    Jan. 20, 2011

Related U.S. Application Data

(62) Division of application No. 12/460,439, filed on Jul. 17, 2009.

(51) Int. Cl.
*G01W 1/00*    (2006.01)
(52) U.S. Cl. .................................................. 73/170.24
(58) Field of Classification Search .................... None
See application file for complete search history.

(56) References Cited

U.S. PATENT DOCUMENTS

| 1,266,175 | A |   | 5/1918 | Tesla |
| 4,706,016 | A | * | 11/1987 | Schweitzer, Jr. ............... 324/102 |
| 5,323,289 | A | * | 6/1994 | Longsdorf et al. ............. 361/111 |
| 5,485,151 | A | * | 1/1996 | Runyon et al. ................. 340/953 |
| 5,497,138 | A | * | 3/1996 | Malpiece et al. ............... 338/21 |
| 5,675,468 | A | * | 10/1997 | Chang ............................ 361/119 |
| 2006/0145807 | A1 | * | 7/2006 | Gautier ........................... 337/36 |

OTHER PUBLICATIONS

Jonassen, Niels; "Environmental ESD, Part II: Thunderstorms and Lightning Discharges"; Compliance Engineering; dated 2005; pp. 1-8; located at: http://www.ce-mag.com/archive/02/09/mrstatic.html.
Google search results; "Lightning Streamers or Lightning in Slow Motion", printed on Dec. 12, 2010; 1 page.
YouTube search results; "Lightning in Slow Motion", printed on Dec. 12, 2010; 2 pages.

* cited by examiner

*Primary Examiner* — Andre J Allen

(57) ABSTRACT

Systems and methods for dynamically defending a site from lightning strikes are provided. The systems and methods involve dynamically altering electrostatic fields above the site and/or dynamically intervening in lightning discharges processes in the vicinity of the site.

31 Claims, 13 Drawing Sheets

Lightning Stepped Leaders

FIG. 8

Method 800

---
810
Dispose a plurality of lightning arrestors to protect a site from atmospheric electrical discharges ---
820
Bias a first of the lightning arrestors to a different respective potential than a second of the lightning arrestors

FIG. 9

Method 900

910
Sense a lightning step leader leaving an atmospheric charge accumulation and/or sense an upward earth streamer;

920
Prepare a charge conductive path through the atmosphere to ground in response to a sensed step leader and/or sensed upward earth streamer.

FIG. 11

1110
Sense a lightning step leader leaving an atmospheric charge accumulation and/or sense an upward earth streamer;

1120
Prepare a charge conductive path through the atmosphere to ground in response to a sensed step leader and/or sensed upward earth streamer.

Method 1100

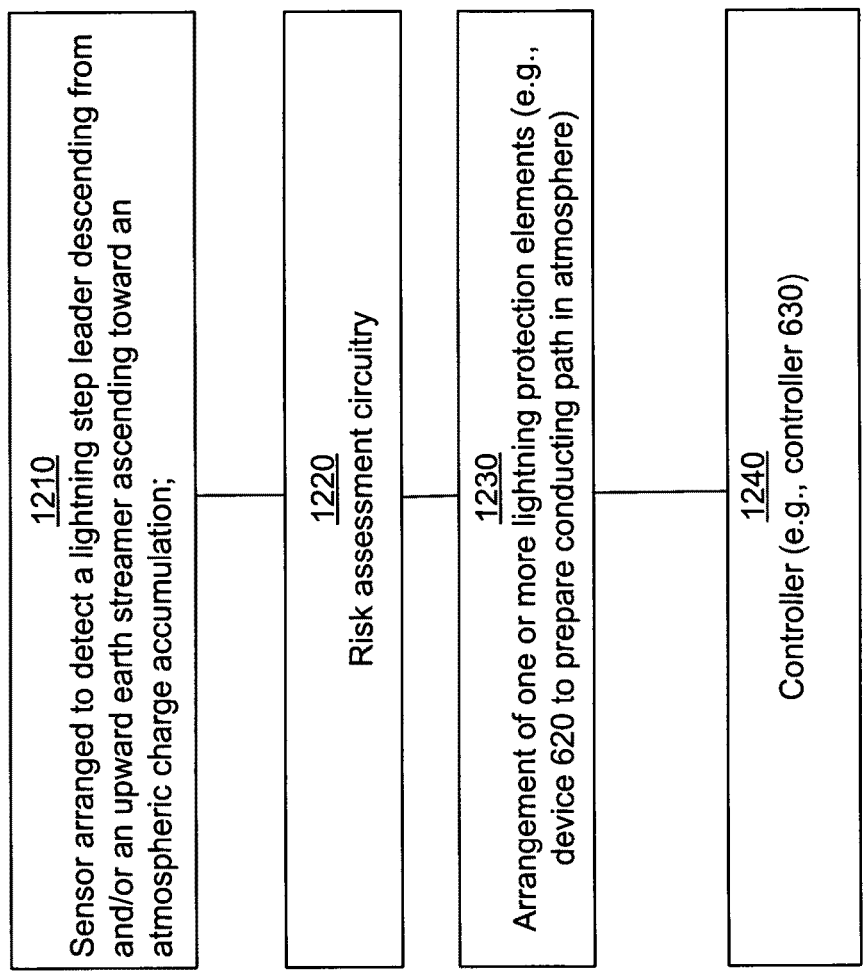

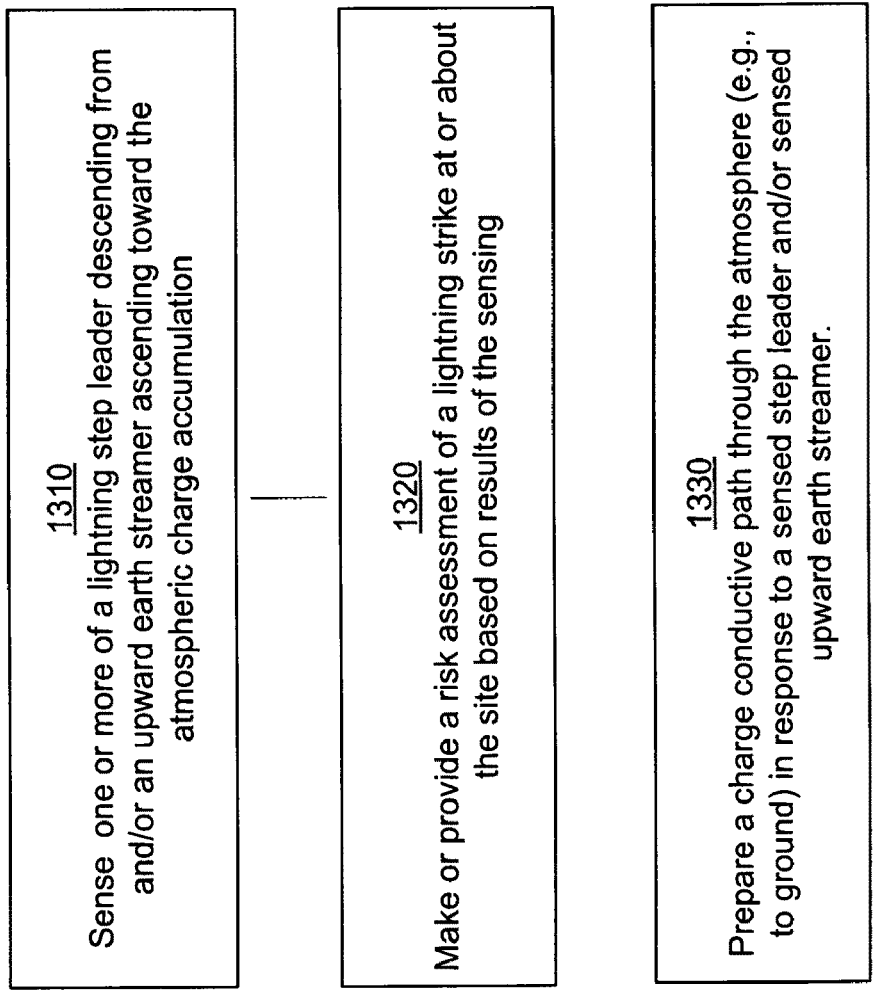

SYSTEMS AND METHODS FOR PROTECTING A SITE FROM LIGHTNING STRIKES

For purposes of the USPTO extra-statutory requirements, the present application constitutes a divisional of U.S. patent application Ser. No. 12/460,439, entitled POLARIZED LIGHTNING ARRESTORS, naming Roderick A. Hyde, Muriel Y. Ishikawa, Jordin T. Kare, Thomas Allan Weaver, Lowell L. Wood, Jr. and Victoria Y.H. Wood as inventors, filed on Jul. 17, 2009, which is currently co-pending, or is an application of which a currently co-pending application entitled to the benefit of the filing date.

BACKGROUND

A lightning protection system protects a structure from damage due to lightning strikes, either by safely conducting the strike to the ground, or preventing the structure from being struck. Lightning protection systems are commonly installed on structures, buildings, trees, monuments, bridges and water vessels to protect from lightning or electrical discharge damage. Lightning protection systems are also used to protect appliances, machinery, electrical systems and electronic equipment from lightning or electrical discharge damage. Most lightning protection systems are composed of a network of lightning rods and/or lightning arrestors (surge protectors), metallic cable conductors, and ground electrodes designed to provide a low impedance path for the lightning to travel through to the ground.

A lightning rod is a metal strip or rod with a conductive cable or other low-resistance path to ground. A lightning rod, which is usually installed on a rooftop, provides a point well above the structure to be protected with a very good, earthed connection. Because of its position, shape, and conductivity, the lightning rod may draw energy (current) from a lightning discharge and diverts the energy to ground via the conductive cable to ground, thus preventing damage to the structure. FIG. 1, which is adapted from Tesla U.S. Pat. No. 1,266,175, shows an early lightning rod.

A lightning arrestor is a device, which is typically used for protecting electronic or electrical equipment from lightning by diverting any surges of high-voltage electricity caused by atmospheric discharges to ground. The lightning arrestor includes an "active" element, which switches from a non-conductive state to a conductive state in response to a surge in voltage. The active element in its conductive state provides a short i.e. a path for the high voltage to go to ground, bypassing the electronic or electrical equipment to be protected. In other words, the active element acts as an over-voltage release valve. The active element of a lightning arrestor may, for example, be a metal oxide varistor, a transient suppression diode, a gas discharge tube, a spark gap, a crowbar (circuit) using a Zener diode driving the gate of a silicon-controlled rectifier (SCR) latch, or any other suitable device. For convenience in description, both lightning rods and lightning arrestors may be referred to as lightning arrestors herein.

Consideration is now being given to improving traditional lightning protection systems.

SUMMARY

Approaches to defend a site from lightning strikes are provided. Illustrative approaches involve altering electrostatic fields above the site and/or dynamically intervening in lightning discharge processes in the vicinity of the site.

In an exemplary approach, a system for defending a site includes a plurality of lightning arrestors. The electrostatic fields above the site are modified by the system to influence overhead electrical discharge processes. One or more voltage biasing elements are arranged to bias a first of the lightning arrestors to a different respective potential than a second of the lightning arrestors. The respective potentials to which the lightning arrestors are biased are below a corona discharge limit.

In another exemplary approach, a system for defending a site involves altering the path of an overhead lightning discharge. The illustrative system includes a sensor network arranged to detect a lightning step leader descending from an overhead atmospheric charge accumulation and/or an upward rising earth streamer. The system includes devices (e.g., lasers, charge guns, etc.) for making ionized path segments in the atmosphere to extend or limit progress of the lightning step leader and/or earth streamer in selected directions.

BRIEF DESCRIPTION OF THE FIGURES

In the accompanying drawings:

FIG. 8 is a flow diagram illustrating an exemplary method for lightning protection, in accordance with the principles of the solutions described herein;

FIG. 9 is a flow diagram illustrating another exemplary method for lightning protection, in accordance with the principles of the solutions described herein;

FIG. 11 is a flow diagram illustrating yet another exemplary method for lightning protection, in accordance with the principles of the solutions described herein;

FIG. 12 is a block diagram illustrating components of still another exemplary lightning protection system, in accordance with the principles of the solutions described herein; and FIG. 13 is a flow diagram illustrating still another exemplary method for lightning protection, in accordance with the principles of the solutions described herein.

Throughout the figures, unless otherwise stated, the same reference numerals and characters are used to denote like features, elements, components, or portions of the illustrated embodiments.

DESCRIPTION

In the following description of exemplary embodiments, reference is made to the accompanying drawings, which form a part hereof. It will be understood that embodiments described herein are examples, but are not meant to be limiting. Further, it will be appreciated that the solutions described herein can be practiced or implemented by other than the described embodiments. Modified embodiments or alternate embodiments may be utilized, in the sprit and scope of the solutions described herein.

In an exemplary approach for protecting a site from lightning strikes emanating from overhead charge accumulations, electrostatic fields above the site may be modified by applying external voltages to air termination networks deployed at the site. The modification of the electrostatic fields, which may be dynamic in response to changing weather conditions, may be expected to help dissipate the overhead charge accumulations and/or relocate possible lightning strikes away from the protected site.

Figure 1:
FIG. 1 is an illustration of a lightning rod and a grounding arrangement.
Figure 2:
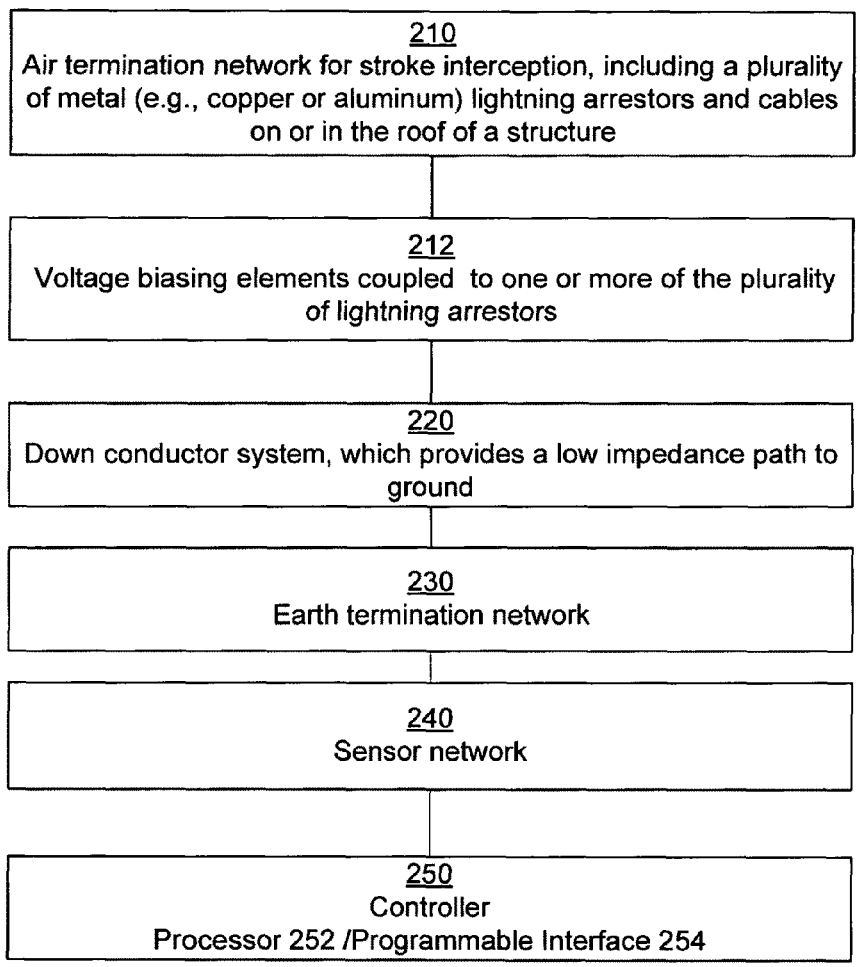
FIG. 2 is a block diagram illustrating components of an exemplary lightning protection system, in accordance with the principles of the solutions described herein.

FIG. 2 shows exemplary components of a lightning protection system 200 in accordance with the principles of the solutions described herein. Lightning protection system 200 includes an air termination network 210, voltage biasing elements 212, a down conductor system 220, and an earth termination network 230. System 200 may further include an optional sensor network 240 configured to monitor and report, for example, weather, atmospheric, or other environmental conditions that may be present or anticipated at or about lightning protection system 200 and protected structures. Sensor network 240 may generate appropriate reporting signals for use by lightning protection system 200 and/or other external devices. System 200 also may include an optional controller 250. Operation of various components of lightning protection system 200 may be supervised by controller 250 or other controller systems that may be located nearby or distant from lightning protection system 200 and protected structures. In one approach, for example, the operation of voltage biasing elements 212 and/or sensor network 240 may be controlled through a remote control system located at a different facility or site, for example, through wireless, wired, IP protocol or other approaches.

Air termination network 210 may include one or more lightning arrestors arranged to interact with or intercept an atmospheric electrical discharge or lightning stroke. The number and type of lightning arrestors in air termination network 210 may be selected in consideration of the type of structure or site to be protected by air termination network 210. When the structure to be protected is a building, air termination network 210 may, for example, include a plurality of vertical metal (e.g., copper or aluminum) lightning rods disposed on the roof of the building. When the structure to be protected is a high voltage power transmission line, air termination network 210 may, for example, include conducting ropes, cables, netting, mesh, extended surfaces and/or rods. It will be understood that structures and sites that can be protected by air termination network 210 are not limited to a particular type or size of structures (e.g., a building) but may include combinations of several types of structures (e.g., buildings, power lines, transmission line towers, antennas, etc.) of any size or extent.

In system 200, down conductor system 220 connects air termination network to an earth termination network 230. Down conductor system 220 may be suitably arranged to provide a lightning stroke current a low impedance path to earth termination network 230. Down conductor system 220 may include any suitable arrangement of conducting cables and/or wires for this purpose. Likewise, earth termination network 230 may include any combination of earthed rods, plates and/or conductors arranged for safe dissipation of the stroke current into the ground or a ground equivalent.

Further, in system 200, voltage biasing elements 212 may be EMF sources, which are coupled to one or more individual lightning arrestors in air termination network 210. Voltage biasing elements 212 may, for example, include capacitors, a voltage amplifier and/or very high impedance high-voltage (~0.1-1 MV; ~10-1000 micro amp) power supplies. The power supplies may, for example, be energized by solar photovoltaic arrays deployed in outdoor locations.

Voltage biasing elements 212 may be disposed anywhere between ground and lighting arrestors' tips. Thus, voltage biasing elements 212 may be disposed in air termination network 210 and/or down conductor system 220 as convenient or appropriate. It will be understood that voltage biasing elements 212 may be provided with protective active elements (not shown) configured to block or divert over-voltages and/or over-currents, which may arise in the operation of air termination network 210. Voltage biasing elements 212 may be configured to raise or lower the potential at about an end of a lighting arrestor by an applied potential amount $V_b$ relative to a reference potential. The reference potential may, for example, be another lighting arrestor's potential, ground potential, or other intermediate potential. Further, voltage biasing elements 212 may be configured to apply the potential $V_b$ continuously or intermittently over selected time intervals.

Raising or lowering a lighting arrestor's potential by a bias voltage $V_b$ may provide polarizing fields above the lighting arrestor that interact with overhead atmospheric charge accumulations. The polarizing fields may allow system 200 to preferentially source or sink electric charge to or from overhead atmospheric charge accumulations via the biased, relative to an identical unbiased or 'simply grounded' lightning arrestor in the same location at the same instant-in-time. From another perspective view, biasing the lightning arrestor may provide a 'virtual' lightning arrestor of much greater "effective height" than anything else in the vicinity. The effective height of the lightning arrestor may be selected by applying a suitable amount of bias voltage so that all proximate objects are robustly defended from the damaging effects of lightning stroke currents.

Figure 3:
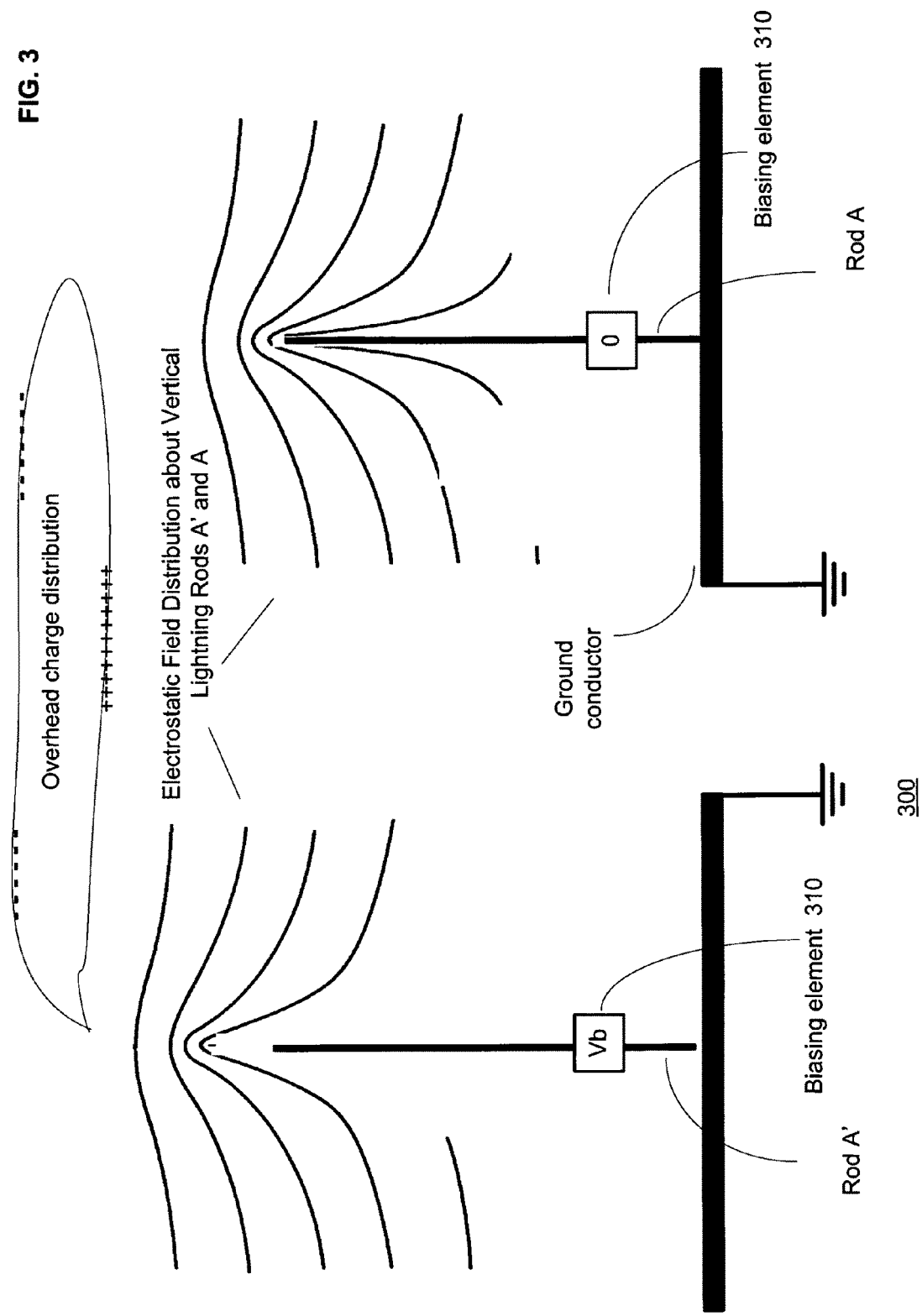
FIG. 3 is a schematic illustration of an exemplary lightning arrestor in biased and unbiased states, in accordance with the principles of the solutions described herein.

FIG. 3 shows an example of a lightning arrestor rod A with a voltage biasing element 310 disposed toward its base. No bias voltage is applied to lightning arrestor rod A in the condition shown, for example, to the right in FIG. 3. Application of a bias voltage $V_b$ to lightning rod A as shown, for example, to the left in FIG. 3, displaces or polarizes electrical fields near the top end of the rod and increases the effective length of the rod. The amount and sign of bias voltage $V_b$ applied may be limited so that rod A operates below a corona discharge limit. However, the amount and sign of bias voltage $V_b$ may be sufficient so that the displaced or polarized electrical fields about voltage-biased rod A' can interact with and modify overhead atmospheric charge accumulations in a different manner than the unbiased rod A.

Modification of overhead atmospheric charge accumulations by polarizing fields created by the bias voltage applied to the lightning arrestor may be expected to provide spatial and temporal control over dissipation of lightning stroke energy emanating from the overhead charge accumulations. The amount of bias voltage may, for example, be selected to break down air and provisionally or peremptorily prepare a sufficiently large conducting path between ground and the overhead charge accumulations to reduce the latter. The time interval over which the bias voltage is applied may be selected in consideration of the dynamics of overhead charge accumulations and the rates of charge dissipation by the "virtual" portion of the lightning arrestor created by the bias voltage. Such consideration may include consideration of the rates of charge dissipation by the bias voltage-induced virtual portion of the lightning arrestor relative to, for example, a meteorologically maximum feasible rate of accumulation of overhead charges. It may be necessary to apply the bias voltage to the lightning arrestor only momentarily or only as a transient to prepare a conducting path for dissipating dangerous overhead charge accumulations.

The amount and application times of bias voltage applied to rod A may be selected to provide adequate provisional or preemptory conductive paths from overhead charge accumulations to ground, which make it effectively impossible for a lightning bolt to strike within a select distance in space and time from lightning rod A. Suitable theoretical or empirical models of atmospheric charge accumulations and their interactions with lightning arrestors may be developed and used to compute the amount and timing of bias voltages applications required to prevent a lightning bolt from striking within a selected distance from lightning rod A.

With renewed reference to FIG. 2, controller 250 may have any suitable mechanical or electromechanical structure. Further, controller 250 may optionally include or be coupled to a processor 252 and/or a programmable interface 254. Controller 250 may be configured to implement suitable biasing schedules (e.g., timing, amount and sign of bias voltages Vb applied by voltage biasing elements 212) for various lightning arrestors. Controller 250/processor 252 may determine the suitable biasing schedules based, for example, on signals generated by sensor network 240 and/or other external devices. Algorithms for determining the suitable biasing schedules and the responses of system 200/controller 250 to various sensor network 240 signals and/or other control signals may be set up or programmed by a user, for example, through programmable interface 254.

Processor 252 may use the algorithms to compute model lightning strike-safe distances and corresponding voltage biasing schedules for the lightning arrestors in air termination network 210. Processor 252 may be configured to obtain air termination network 210 conditions and weather conditions at or about air termination network 210 and its protected structures from sensor network 240 or other external sources (e.g., meteorological stations). Processor 252 may be further configured to develop prophylactic voltage biasing schedules to prevent imminent lightning strikes from present and/or forecasted overhead charge accumulations. Further, controller 250 may be configured to dynamically implement the prophylactic voltage biasing schedules generated by the processor or other voltage biasing schedules on the lightning arrestors in air termination network 210.

The development of the voltage biasing schedules may also include consideration of the spatial distribution of lightning arrestors in air termination network 210, and consideration of a user-defined prioritization or ranking of different portions of the protected structure or site according to importance for protection from atmospheric electrical discharges. A user-defined ranking may, for example, deem a portion of a protected structure that houses computer or other sensitive electronic equipment as needing more or better protection from lightning strikes than other portions of the protected structure that do not house such equipment. Accordingly, the voltage biasing schedules may include spatial variation in the biasing of a distribution of lightning arrestors in air termination network 210 to provide more or better lightning strike protection for the priority portions of the protected structure.

Figure 4:
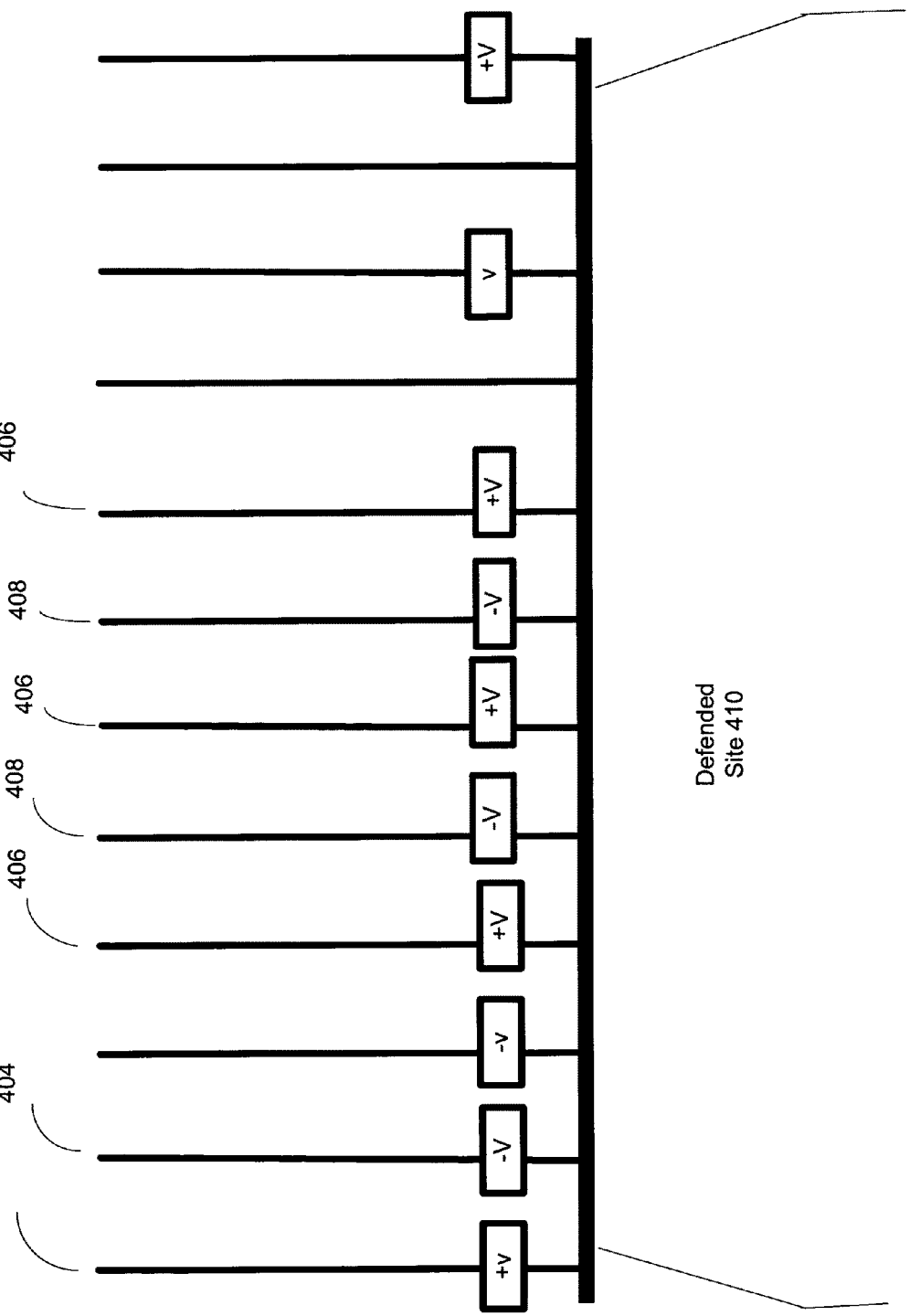
FIG. 4 is schematic illustration of an exemplary sequence of lightning arrestors in varying biased states, in accordance with the principles of the solutions described herein.

More generally, variation in potential biasing of a spatial distribution of lightning arrestors may be used to control a location of the provisional or preemptive conducting path from overhead charge accumulations to ground. FIG. 4 shows, for example, an air termination network 400 deployed to defend site 410. Different lightning arrestors (e.g., rods 402-408) in air termination network 400 may be charged by respective voltage biasing elements to different respective potentials to defend site 410 from atmospheric electrical discharges. At least one lighting arrestor may be charged to a potential in anticipation of a lightning strike. A first lightning arrestor (e.g., rod 402) may be charged to a positive potential and a second lightning arrestor (e.g., rod 404) may be charged to a negative potential relative to a site or reference potential. Further, air termination network 400 may include a sequence of alternating positively and negatively charged lightning arrestors (e.g., rods 406 and 408).

Site 410 defended by deploying air termination network 400 may, for example, be an overhead AC transmission line from lightning or atmospheric electrical discharges. In this example, air termination network 400 may include a sequence of lightning arrestors that are alternating positively and negatively charged to potentials having magnitudes greater than a peak line voltage on the overhead AC transmission line. Alternatively or additionally, site 410 by deploying air termination network 400 may include an overhead DC transmission line. In this example, air termination network 400 may include a sequence of lightning arrestors that are respectively charged to potentials greater and less than a line voltage on the overhead DC transmission line.

It will be understood that the lightning arrestors in air termination network 400 are shown to have rod-like long shapes (e.g., rods 402-408) only for example. In practice the lightning arrestors may have any geometrical shape appropriate for defending a particular site from lightning strikes. A lightning arrestor may have a long shape (e.g., rods, wires, Franklin-type lightning rods, spikes, etc.) that is conducive to directional emission of charges from an arrestor end. Alternatively or additionally, a lightning arrestor may have a rounded or planar shape having an extended surface (e.g., panels, plates, conducting shields, walls of Faraday cage-like structures, etc.) that may emit charges non-directionally or less directionally than a long-shape lightning arrestor. At least one of the plurality of lightning arrestors in an air termination network may have a rod-, rope-, cable-, wire-, mesh-, netting-, strip-, plate-, panel-, wall-, and/or other extended surface-shape.

In another exemplary approach for protecting a site from lightning strikes from overhead charge accumulations involves a dynamic defense. In this approach, artificial man-made conducting channels of ionized air may be created in the atmosphere in a controlled manner. The artificial man-made conducting channels of ionized air may be expected to help dissipate overhead charge accumulations and to reduce damage from randomly located lightning strikes.

A lightning discharge or flash (e.g., a cloud-to-ground discharge) is a transient current of high intensity often spanning several kilometers. A cloud-to-ground discharge may be made up of a series of partial discharges separated in time by 40-50 milliseconds and lasting about 200 milliseconds for a total flash.

Figure 5:
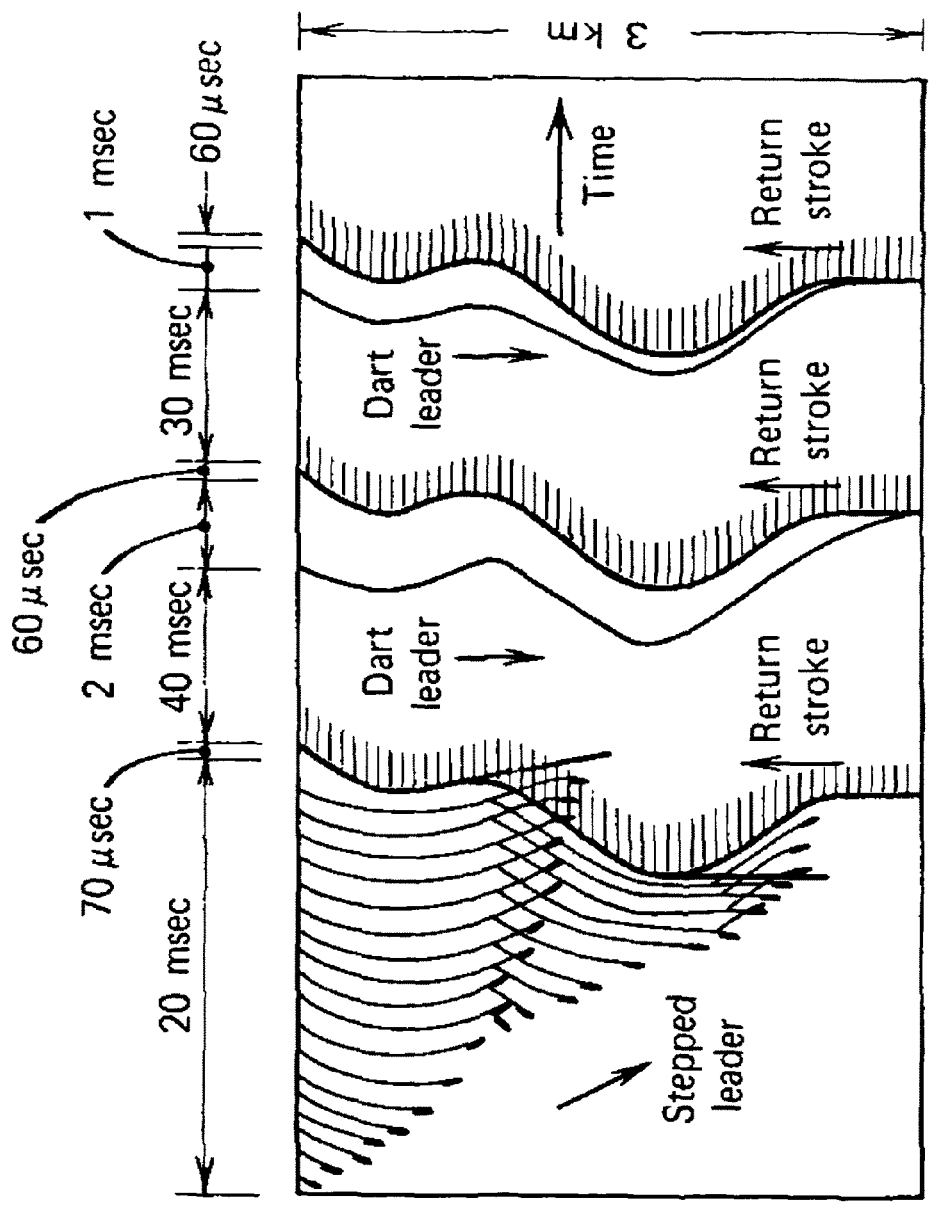
FIG. 5 is an illustration of a lightning discharge or flash process as may be recorded with a streak-camera photograph.

FIG. 5, which is adapted from Niels Jonassen, Environmental ESD, Part II: Thunderstorms and Lightning Discharges, Compliance Magazine, (2005), shows characteristic features of a cloud-to-ground lightning discharge or flash as they would appear on a streak-camera photograph. Each lightning discharge starts with a predischarge or leader ("stepped leader" or "step leader") that propagates from the cloud to the ground in weakly luminous steps. The stepped leader, which is a channel of high ionization and charge, appears to move downward from the cloud in luminous steps about 50 m in length. The time between steps is about 50 microseconds, during which time the intensity of the stepped leader is too weak to be observed. As the step leader approaches the earth, objects on the earth surface begin responding by growing positive streamers. When the downward stepped leader brings negative charge at high potential close to the ground, the field strength at ground level may be high enough to cause ionization and make a discharge (earth streamer) move from the ground to the leader. When the two discharges meet, the step leader is effectively grounded and its conductive channel may support a very luminous main or return stroke. The main or return stroke may carry strong currents (e.g., 10-20 kA during the first few microseconds). Considerable amounts of energy, which are commonly associated with a lightning strike, are dissipated by the main or return stroke in the ionized channel established by the stepped leader. After the current has ceased to flow down the stepped leader channel, there may be a pause of about 20 to 50 milliseconds. After which, if additional charge is available in the cloud at the top, another leader ("dart leader"), which is not stepped, may propagate down the already established but decaying ionized channel. The dart leader carries the cloud potential to the vicinity of the ground. Again, a main or return stroke can be produced. All strokes that use the same ionized channel to ground constitute a single cloud-to-ground lightning flash. The combination of the leader and the return stroke is known as a stroke. A lightning flash might be made up of one to a few tens of strokes.

Figure 6:
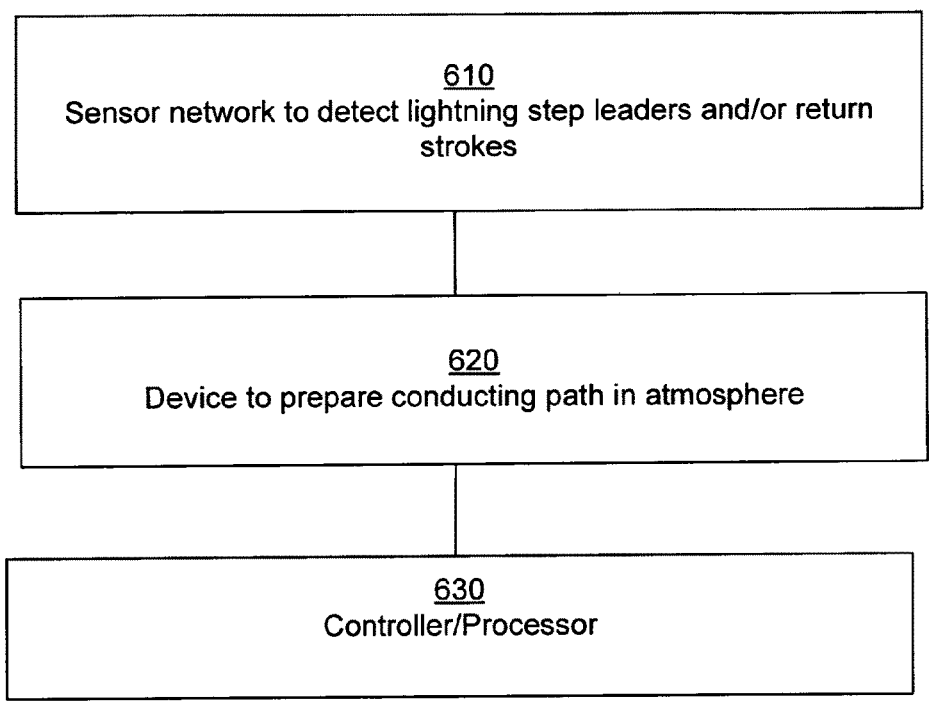
FIG. 6 is a block diagram illustrating components of another exemplary lightning protection system, in accordance with the principles of the solutions described herein.

FIG. 6 shows exemplary components a lightning protection system 600 for dynamic defense of a site from lightning strikes. System 600 involves preparing or creating charge conducting channels or paths in the atmosphere in a controlled manner to dissipate atmospheric charge accumulations (e.g., in clouds). A charge conducting channel or path may include regions of the atmosphere having modified dielectric properties, excited molecules and/or ionized molecules, which make it likely to support flow of currents therethrough.

System 600 includes a sensor network 610 arranged to detect lightning step leaders and/or return strokes in the vicinity of a defended site, and a device 620 for preparing or creating charge conducting channels in the atmosphere. System 600 may also include other lightning protection components (e.g., air termination network 210) for protecting the site. Further, system 600 includes a controller/processor 630, which is configured to supervise or co-ordinate operation of system components. Controller/processor 630 may have any suitable mechanical or electromechanical structure, and include an optional programmable interface. In one approach, controller/processor 630 and other system components may be linked, for example, through wireless, wired, IP protocol or other approaches.

Device 620 for preparing or creating charge conducting paths or channels in the atmosphere may be any suitable device that can ionize air at selected locations or paths in the atmosphere by, for example, directing ionizing energy or supplying charges at the selected locations. Device 620 may, for example, be an energy or particle beam generator. In an exemplary implementation of system 600, device 620 may, for example, include a high energy pulsed laser and/or a high energy capacitor discharge circuit and a ground charge injector.

Sensor network 610 may include one or more electrical, magnetic, optical and/or other sensors configured to determine the location and timing of stepped leaders that may precede main or return lightning strokes at or in the vicinity of the defended site. Sensor network 610 may also include sensors configured to measure earth potentials and/or determine the location and timing of earth streamers that may develop into a return lightning stroke in the vicinity of the defended site. Sensor network 610 may be configured to generate appropriate reporting signals for use by lightning protection system 600 and/or other external devices for dynamically defending the site from lightning strikes.

Figure 7:
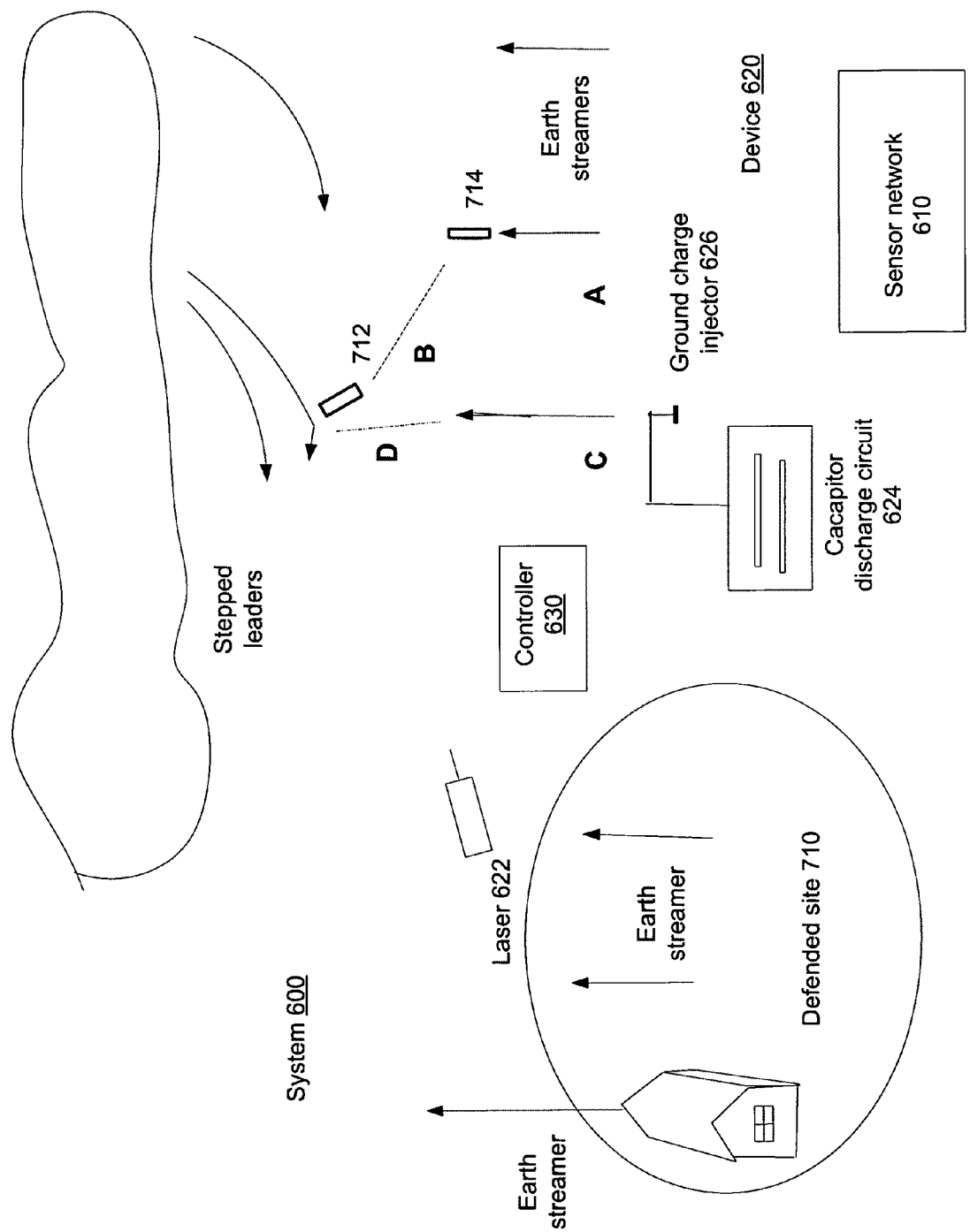
FIG. 7 is a schematic illustration of an exemplary deployment of lightning protection system of FIG. 6 deployed to protect a site from lightning strikes, in accordance with the principles of the solutions described herein.

FIG. 7 shows an exemplary deployment of system 600 to defend a site 710 from lightning strikes. In this exemplary deployment, device 620 may include a laser 622, and a charged capacitor discharging circuit 624 coupled to a ground charge injector 626. System 600/controller 630 may include suitable algorithms or routines for responding to step leader activity, ground streamer activity, and/or ground potential values detected in the vicinity of the defended site 710 by sensor network 610. The algorithms or routines may include an assessment of a likely location of an impending lightning strike based, for example, on the locations and timing of the detected step leaders, earth streamers, and/or measured earth potential values. In response to the assessment, system 600/controller 630 may operate or activate device 620 to prepare charge conducting channels or paths (e.g., paths segments 712 and 714) in the atmosphere to modify the course of the impending lightning strike.

In an exemplary mode of operation of system 600, laser 622 may, for example, direct an ionizing energy beam to create an ionized path segment (712) extending or limiting a detected stepped leader in a particular direction. Alternatively or additionally, laser 622 may direct an ionizing energy beam to create an ionized path segment (714) extending or limiting an earth streamer in a particular direction. The ionized path segments 712 and/or 714, which are artificially created by device 620, may be suitably oriented to direct the stepped leader away from defended site 710 or to connect the stepped leader to an earth streamer at a selected ground location (e.g., location A) at a safe distance from defended site 710. In this manner, system 600 may prepare an attractive conduction path (B) directed away from defended site 710 for the impending lightning strike.

In an additional or alternate mode of operation, system 600 may help generate attractive conduction path (e.g., path D) directed away from defended site 710 for the impending lightning strike by modifying ground potentials at select locations. In this mode of operation, charged capacitor discharging circuit 624 may provide charge, which is then injected into the earth at a selected earth location (e.g., location C) by ground charge injector 626. The amount of the injected charge may be selected to be sufficient to raise the local earth potential to encourage an earth streamer at location C to grow toward and connect to an overhead stepped leader. In this manner, system 600 may prepare an attractive conduction path (D) directed away from defended site 710 for the impending lightning strike.

Methods for protecting sites from atmospheric electrical discharges include dynamically altering electrostatic fields above the site and/or dynamically intervening in lightning discharges processes in the vicinity of the site. FIGS. 8 and 9 show exemplary methods 800 and 900 for defending a site from lightning.

Method 800, which involves dynamically altering electrostatic fields above the site, includes disposing a plurality of lightning arrestors at a site (810), and biasing various lightning arrestors differently to alter or modify the electrostatic potential distributions above the site (820). The biasing of the various lightning arrestors may have a spatial variation based, for example, on consideration of relative importances of protecting different portions of the site from lightning. At least one of the lightning arrestors may be biased to a different respective potential than a second of the lightning arrestors. Method 800 may include sensing overhead electrical activity and/or weather conditions to guide a biasing schedule of the various lightning arrestors.

Method 900, which involves dynamically intervening in lightning discharge processes in the vicinity of the site, includes sensing a lightning step leader leaving an overhead atmospheric charge accumulation (910) and/or an upward earth streamer, and in response to a detected step leader, preparing a charge conductive path through the atmosphere to ground to divert the lightning strike or otherwise dissipate the overhead atmospheric charge accumulation (920). In method 900, preparing a charge conductive path through the atmosphere to ground may include firing a laser beam through the atmosphere to ionize air, injecting charges in the atmosphere, and/or a ground location to encourage the overhead charge accumulation to dissipate, for example, along a particular path away from the site.

The detailed description herein has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Figure 10:
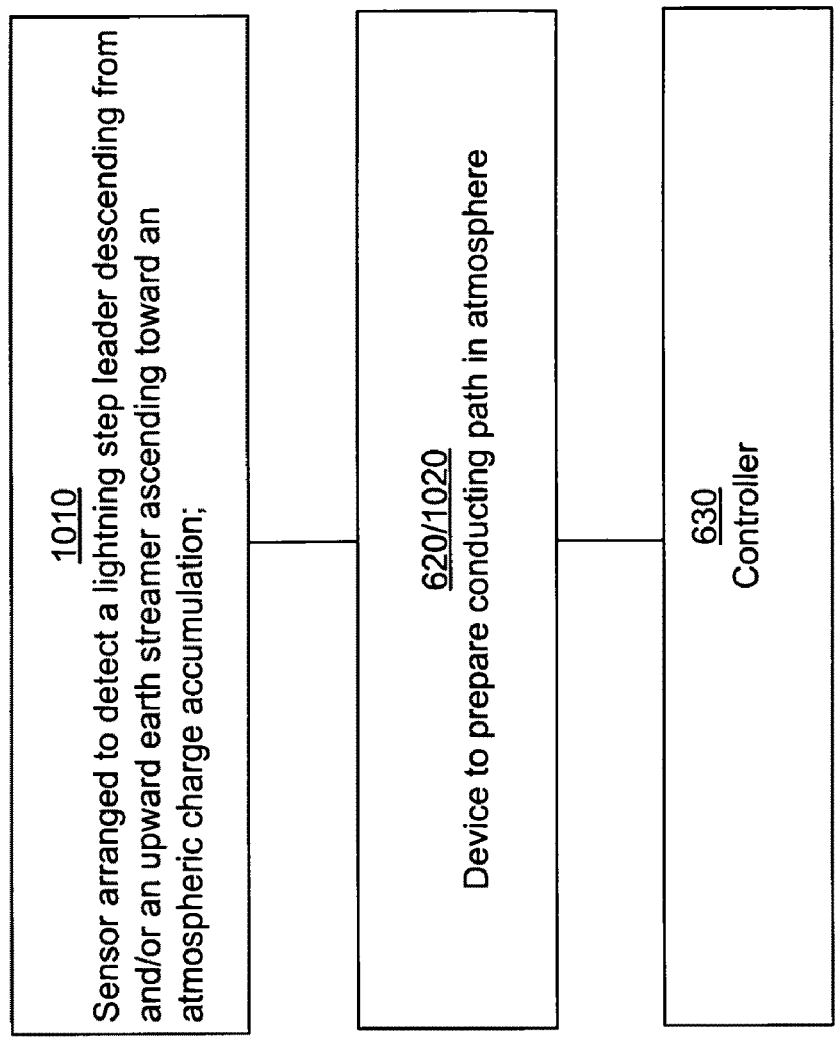
FIG. 10 is a block diagram illustrating components of yet another exemplary lightning protection system, in accordance with the principles of the solutions described herein.

While various aspects and embodiments have been disclosed herein, other aspects and embodiments will be apparent to those skilled in the art. For example, FIG. 10 shows another exemplary lightning protection system 1000. System 1000 may include a sensor or sensor arrangement 1010 arranged to detect a lightning step leader descending from and/or an upward earth streamer ascending toward an atmospheric charge accumulation. Sensor or sensor arrangement 1010 may, for example, be similar to or the same as sensor arrangement 610 (FIG. 6). System 1000 further includes a device 1020 coupled to the sensor or sensor arrangement 1010. Device 1020 may be a charge-emitting device configured to inject charges in the ground (e.g., a capacitor, a current source, devices 624 and 626, etc.). Device 1020 may be configured to alter a ground potential in response to the detected step leader and/or upward earth streamer. When system 1000 is deployed at a site, device 1020 may be arranged to alter the ground potential to direct a lightning strike away from the site. Device 1020 may be arranged to inject charges at or about a selected ground termination location for a lighting strike.

FIG. 11 shows another exemplary lightning protection method 1100, which may for example, utilize system 1000, for protecting a site. Method 1100 includes sensing a lightning step leader descending from and/or an upward earth streamer ascending toward an atmospheric charge accumulation (1110), and altering a ground potential in response to the detected step leader and/or upward earth streamer (1120). Altering the ground potential may include injecting charges in the ground to, for example, direct a lightning strike away from a site. The charges may be injected at or about a selected ground termination location for a lighting strike.

Further, for example, FIG. 12 shows yet another exemplary lightning protection system 1200 for actively protecting a site. Active lightning protection system 1200 may include a sensor arrangement (1210) arranged to detect one or more of a lightning step leader descending from an atmospheric charge accumulation and/or an upward earth streamer ascending toward the atmospheric charge accumulation. Sensor arrangement 1210 may be configured to detect or sense, for example, a strength, a location, a direction and/or a timing of the lightning step leader, the upward earth streamer, and/or the atmospheric charge accumulation. Further, sensor arrangement 1210 may include a sensor arranged to detect or sense a weather condition, a site potential value, and/or a geopotential value.

System 1200 may further include a risk-assessment processor or circuitry (1220), which is coupled to sensor arrangement 1210 and configured to provide a risk assessment of a lightning strike, and an arrangement of one or more reconfigurable lightning protection elements (1230) responsive to the risk assessment of a lightning strike. System 1200 may also include suitable control circuitry 1240 configured to reconfigure the one or more reconfigurable lightning protection elements in response to the risk assessment of a lightning strike.

The arrangement of one or more reconfigurable lightning protection elements 1230 may, for example, include one or more adjustable-height lightning arrestors whose heights are adjustable in response to the risk assessment of a lightning strike. Alternatively or additionally, arrangement 1230 may include one or more lightning arrestors whose potentials are adjustable in response to the risk assessment of a lightning strike (e.g., lightning arrestors 404-408, air termination network 400 (FIG. 4)). Alternatively or additionally, arrangement 1230 may include a device arranged to prepare a charge conductive path through the atmosphere in response to the detected step leader and/or the detected upward earth streamer. The device may, for example, be the same or similar to the devices in systems 600 and 1000 (e.g., device 620, laser 622, capacitor discharge circuit 624, ground injector 626, device 1020, etc.).

System 1200/control circuitry 1240 may be configured so that a ready-to-operate status of system components (e.g., arrangement of one or more lightning protection elements 1230, device 620, laser 622, capacitor discharge circuit 624, ground injector 626, device 1020, etc.) is configured to be responsive to progressive or developing risk assessments of a lightning strike.

The charge conductive path through the atmosphere prepared by system 1200 in response to the detected step leader and/or the detected upward earth streamer may include excited molecules and/or ionized molecules. A position and/or direction of the charge conductive path may be selected or determined in response to a location and/or direction of the detected step leader, the detected upward earth streamer and/or atmospheric charge accumulation. The charge conductive path may have characteristics or properties that are, for example, similar to the charge conductive paths prepared by system 600 described herein with reference to FIGS. 5-7.

FIG. 13 shows another exemplary lightning protection method 1300, which may for example, utilize system 1200, for actively protecting a site. Method 1300 may, for example, include sensing one or more of a lightning step leader descending from and/or an upward earth streamer ascending toward the atmospheric charge accumulation (1310) at or about the site, making or providing a risk assessment of a lightning strike at or about the site based on results of the sensing (1320), and reconfiguring an arrangement of one or more lightning protection elements disposed at or about a site in response to the risk assessment of a lightning strike (1330).

When the arrangement of one or more lightning protection elements includes adjustable-height lightning arrestors, reconfiguring the arrangement of lightning protection elements 1330 may include adjusting the heights of the lightning arrestors in response to the risk assessment of a lightning strike.

In general, detailed, additional and alternate processes and actions in method 1300 may be a function of the nature and type of the arrangement of one or more lightning protection elements disposed at or about a site. Method 1300 may, for example, include one or more steps, actions and processes described herein (e.g., with reference to methods 800, 900, and 1100) as appropriate to the nature and type of the arrangement of one or more lightning protection elements disposed at or about a site. For example, when the lightning protection elements are the same or similar to lightning arrestors 402-408 of air termination network 400 (FIG. 4), method 1300 may include processes and actions that are the same or similar to those described with reference to method 800. When the lightning protection elements include devices to prepare conducting paths through the atmosphere, for example, in response to lightning step leaders or upward earth streamers (FIGS. 6, 7, and 10), method 1300 may include processes and actions that are the same or similar to those described with reference to methods 900 and 1100.

The various aspects and embodiments disclosed herein are for purposes of illustration and are not intended to be limiting, with the true scope and spirit being indicated by the following claims.

The invention claimed is:

1. A system, comprising:
    a sensor arranged to detect a lightning step leader descending from and/or an upward earth streamer ascending toward an atmospheric charge accumulation; and
    a device coupled to the sensor and arranged to prepare a charge conductive path through the atmosphere in response to a detected step leader and/or an upward earth streamer.

2. The system of claim 1, wherein the charge conductive path comprises excited molecules and/or ionized molecules.

3. The system of claim 1, wherein the device is arranged to create a charge conductive path which allows charges in the atmospheric charge accumulation to dissipate.

4. The system of claim 1, wherein the device is arranged to prepare a charge conductive path through the atmosphere to ground in response to a detected step leader and/or upward earth streamer.

5. The system of claim 1, wherein the device is arranged to prepare a charge conductive path whose position and/or direction is responsive to a location and/or direction of the detected step leader and/or the detected upward earth streamer.

6. The system of claim 1, wherein the device is arranged to prepare a charge conductive path whose position and/or direction is responsive to a location the atmospheric charge accumulation.

7. The system of claim 1, wherein the system is deployed to protect a site, and wherein a ground termination point of the charge conductive path is sufficiently remote to avoid a direct lightning strike at the site.

8. The system of claim 1, wherein the sensor is further configured to detect a start of a main or return lightning stroke.

9. The system of claim 1, wherein the device is arranged to create the charge conductive path in response to a detected start of a main or return lightning stroke.

10. The system of claim 1, wherein the device arranged to create a charge conductive path through the atmosphere comprises a laser.

11. The system of claim 10, wherein the laser is arranged to emit a light beam through the atmosphere.

12. The system of claim 1, wherein the device comprises a charge-emitting device configured to inject charges in the atmosphere.

13. The system of claim 12, wherein the charge-emitting device is configured to emit charges substantially directionally.

14. The system of claim 1, wherein the device comprises a charge-emitting device configured to inject charges in the ground.

15. The system of claim 14, wherein the device arranged to inject charge at about a ground termination location of the charge conductive path.

16. The system of claim 1, wherein the device arranged to create a charge conductive path through the atmosphere comprises a capacitor.

17. The system of claim 16, wherein the device arranged to create a charge conductive path through the atmosphere further comprises a circuit configured to fire a capacitor.

18. A method, comprising:
    sensing a lightning step leader leaving an atmospheric charge accumulation and/or sensing an upward earth streamer; and
    preparing a charge conductive path through the atmosphere in response to a sensed step leader and/or upward earth streamer.

19. The method of claim 18, wherein the charge conductive path comprises excited molecules and/or ionized molecules.

20. The method of claim 18, wherein preparing a charge conductive path through the atmosphere comprises preparing a charge conductive path to ground in response to a sensed step leader and/or upward earth streamer.

21. The method of claim 18, wherein preparing a charge conductive path through the atmosphere comprises allowing charges in the atmospheric charge accumulation to dissipate through the charge conductive path.

22. The method of claim 18, wherein preparing a charge conductive path through the atmosphere comprises preparing the charge conductive path with a sufficiently remote ground termination point to avoid a direct lightning strike at a site.

23. The method of claim 18, further comprising sensing a start of a main or return lightning stroke.

24. The method of claim 23, wherein preparing a charge conductive path through the atmosphere comprises preparing the charge conductive path in response to a start of a main or lightning return stroke.

25. The method of claim 18, wherein preparing a charge conductive path through the atmosphere comprises firing a laser beam through the atmosphere.

26. The method of claim 18, wherein preparing a charge conductive path through the atmosphere to ground comprises injecting charges in the atmosphere.

27. The method of claim 24, wherein injecting charges in the atmosphere comprises injecting charges substantially directionally.

28. The method of claim 18, wherein preparing a charge conductive path through the atmosphere to ground comprises injecting charges in the ground.

29. The method of claim 26, wherein injecting charges in the ground comprises injecting charges substantially about a ground termination location of the charge conductive path.

30. The method of claim 18, wherein preparing a charge conductive path through the atmosphere comprises firing a capacitor.

31. The method of claim 18, wherein preparing a charge conductive path through the atmosphere comprises injecting charge into ground.

* * * * *